United States Patent
Kang et al.

(10) Patent No.: US 10,564,457 B2
(45) Date of Patent: Feb. 18, 2020

(54) BACK COVER AND DISPLAY DEVICE INCLUDING THE SAME

(71) Applicant: LG Display Co., Ltd., Seoul (KR)

(72) Inventors: Choun-Sung Kang, Goyang-si (KR); Se-Eun Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/209,741

(22) Filed: Dec. 4, 2018

(65) Prior Publication Data

US 2019/0179193 A1   Jun. 13, 2019

(30) Foreign Application Priority Data

Dec. 11, 2017  (KR) .................. 10-2017-0169635

(51) Int. Cl.
   *G02F 1/133*     (2006.01)
   *G02F 1/1333*    (2006.01)

(52) U.S. Cl.
   CPC .. *G02F 1/133308* (2013.01); *G02F 1/133345* (2013.01); *G02F 1/133305* (2013.01); *G02F 2001/133314* (2013.01); *G02F 2202/28* (2013.01)

(58) Field of Classification Search
   CPC .......... G02F 1/133308; G02F 1/33345; G02F 1/33305
   USPC ......................................................... 439/58
   See application file for complete search history.

(56) References Cited

U.S. PATENT DOCUMENTS

| | | | | |
|---|---|---|---|---|
| 7,423,878 B2 * | 9/2008 | Kim | ............ | H05K 7/20963 345/905 |
| 7,468,582 B2 * | 12/2008 | Kim | ............ | H05K 7/20963 313/46 |
| 8,681,286 B2 * | 3/2014 | Liang | ............ | G02F 1/133308 349/58 |
| 9,239,154 B2 | 1/2016 | Zeng | | |
| 9,374,927 B2 * | 6/2016 | Byeon | ............ | G02F 1/133308 |
| 9,521,763 B2 * | 12/2016 | Lee | ............ | H05K 5/02 |
| 9,576,510 B2 | 2/2017 | Ren et al. | | |
| 9,713,272 B2 * | 7/2017 | Kim | ............ | G02F 1/133308 |

(Continued)

FOREIGN PATENT DOCUMENTS

| | | |
|---|---|---|
| CN | 103335283 A | 10/2013 |
| CN | 104050882 A | 9/2014 |

(Continued)

OTHER PUBLICATIONS

Taiwan Intellectual Property Office, Office Action, TW Patent Application No. 107144505, dated Aug. 26, 2019, five pages.

(Continued)

*Primary Examiner* — Alexander Gilman
(74) *Attorney, Agent, or Firm* — Fenwick & West LLP (57) ABSTRACT

A back cover is disclosed. The back cover includes a plurality of unit plates connected to the rear surface of a display panel, and a connection unit for interconnecting the unit plates, the connection unit being deformed in order to withstand tensile or compressive stress due to thermal expansion of the display panel. A display device is also disclosed. The display device includes a display panel, a back cover coupled to the rear surface of the display panel, and an adhesive unit for attaching the back cover to the rear surface of the display panel in order to stably support the display panel.

15 Claims, 9 Drawing Sheets

(56) References Cited

U.S. PATENT DOCUMENTS

| | | | |
|---|---|---|---|
| 9,746,701 B2* | 8/2017 | Sung | G09F 9/301 |
| 9,960,186 B2* | 5/2018 | Kim | H01L 27/1218 |
| 9,978,293 B2* | 5/2018 | Cho | H05K 5/0217 |
| 10,074,824 B2* | 9/2018 | Han | G06F 1/1626 |
| 10,126,596 B2* | 11/2018 | Kong | G02F 1/1339 |
| 10,168,743 B2* | 1/2019 | Kuo | G06F 1/1656 |
| 10,178,779 B2* | 1/2019 | Lee | H01L 51/524 |
| 10,185,176 B2* | 1/2019 | Shin | G02F 1/1336 |
| 10,231,346 B2* | 3/2019 | Min | H05K 5/0017 |
| 10,234,708 B2* | 3/2019 | Kim | G02F 1/1333 |
| 10,274,769 B2* | 4/2019 | Kil | G02B 6/0088 |
| 10,281,765 B2* | 5/2019 | Shim | G02B 6/0025 |
| 10,302,852 B2* | 5/2019 | Kim | G02F 1/133615 |
| 10,304,359 B2* | 5/2019 | Park | G09F 13/00 |
| 10,310,310 B2* | 6/2019 | Fu | G02F 1/13 |
| 2007/0228952 A1 | 10/2007 | Kwon et al. | |
| 2013/0170157 A1 | 7/2013 | Park | |
| 2013/0242540 A1 | 9/2013 | Kuo et al. | |
| 2015/0153029 A1 | 6/2015 | Zeng | |
| 2016/0014882 A1 | 1/2016 | Jongman et al. | |
| 2016/0300513 A1 | 10/2016 | Ren et al. | |
| 2016/0357052 A1 | 12/2016 | Kim et al. | |
| 2017/0061836 A1 | 3/2017 | Kim et al. | |

FOREIGN PATENT DOCUMENTS

| | | |
|---|---|---|
| JP | 2013-174692 A | 9/2013 |
| JP | 2017-201393 A | 11/2017 |
| TW | 201435831 A | 9/2014 |
| WO | WO 2015/100404 A1 | 7/2015 |

OTHER PUBLICATIONS

The Intellectual Property Office of the United Kingdom, Combined Search and Examination report under Sections 17 and 18(3), GB Patent Application No. 1819914.1, dated May 20, 2019, seven pages.

Japan Patent Office, Office Action, JP Patent Application No. 2018-229826, Nov. 26, 2019, eight pages.

* cited by examiner

BACK COVER AND DISPLAY DEVICE INCLUDING THE SAME

CROSS-REFERENCE TO RELATED APPLICATIONS

This application claims priority to Republic of Korea Patent Application No. 10-2017-0169635, filed on Dec. 11, 2017, which is incorporated herein by reference in its entirety.

BACKGROUND

Field of Technology

The present disclosure relates to a back cover coupled to the rear surface of a display panel and a display device including the same.

Discussion of the Related Art

Recently, in the information-oriented society, the importance of display devices as a visual information transmission medium has been further emphasized. In order to occupy important positions in the future, requirements such as low power consumption, slimness, reduced weight, and high image quality must be satisfied.

Display devices may be classified into self-emissive display devices, such as a cathode ray tube (CRT) display device, an electro-luminescent (EL) display device, a light-emitting diode (LED) display device, a vacuum fluorescent display (VFD) device, a field emission display (FED) device, and a plasma display panel (PDP), and non-emissive display devices, such as a liquid crystal display (LCD) device.

Among such various kinds of display devices, the liquid crystal display device, which is a device that displays an image using optical anisotropy of liquid crystals, exhibits better visibility than the cathode ray tube display device and lower average power consumption than a cathode ray tube display device having the same screen size. For these reasons, the liquid crystal display device has attracted considerable attention.

The liquid crystal display device is a device configured such that a light source is located under a liquid crystal display panel and an electrical field is applied to liquid crystals to control the arrangement of the liquid crystals, thereby adjusting the transmittance of light emitted from the light source in order to realize an image. In contrast, an organic light-emitting display device is a device configured such that current is applied to a fluorescent organic compound, which is self-emissive, in order to realize an image. The organic light-emitting display device is applied to various kinds of electronic devices, such as a smartphone and a tablet PC.

Meanwhile, in recent years, curved panels have been adopted in display devices. To this end, a back cover is provided at the rear surface of the display panel. When the display device is manufactured in order to satisfy current trends, such as high image quality, slimness, and the provision of a thin bezel, however, the display panel may be damaged due to thermal expansion thereof.

SUMMARY

Accordingly, the present disclosure is directed to a back cover and a display device including the same that substantially obviate one or more problems due to the limitations and disadvantages of the related art.

An object of the present disclosure is to provide a back cover for supporting a display panel that is configured to be bent concavely or convexly, wherein the external shape of the back cover is deformed so as to be extended or compressed in response to thermal expansion of the display panel.

Another object of the present disclosure is to provide a display device including a back cover, wherein the back cover is capable of stably supporting a display panel when the display panel is deformed due to thermal expansion thereof.

Additional advantages, objects, and features of the disclosure will be set forth in part in the description which follows and in part will become apparent to those having ordinary skill in the art, or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a back cover includes a plurality of unit plates connected to the rear surface of a display panel and a connection unit for interconnecting the unit plates, the connection unit being deformed in order to withstand tensile or compressive stress due to thermal expansion of the display panel.

In another aspect of the present disclosure, a display device includes a display panel, a back cover coupled to the rear surface of the display panel, and an adhesive unit for attaching the back cover to the rear surface of the display panel in order to stably support the display panel.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Hereinafter, exemplary embodiments of an organic light-emitting display device according to the present disclosure will be described in detail with reference to the accompanying drawings so that the present disclosure will be easily realized by those skilled in the art. In the drawings, the same elements are denoted by the same reference numerals even when they are depicted in different drawings. In the following description of the present disclosure, a detailed description of known functions and configurations incorporated herein will be omitted when the same may obscure the subject matter of the present disclosure. Those skilled in the art will appreciate that some features in the drawings may be exaggerated, reduced, or simplified for ease of description thereof, and that the drawings and elements therein are not always shown at the actual scale.

In a display device 200 according to the present disclosure, a display panel is a flexible display panel 210 (see FIG. 9) that can be bent or curved in at least one direction. In addition, a glass substrate that is bent at a predetermined curvature may be used.

In the case in which a thin film transistor array substrate is used, the display panel 210 includes a pixel array unit, an encapsulation layer, and a pad unit. The pixel array unit includes a plurality of pixels having organic light-emitting devices provided at pixel areas defined by pixel-driving lines, including gate lines and data lines, for displaying an image according to a signal supplied to the pixel-driving lines. The encapsulation layer is provided to prevent the penetration of moisture into each pixel. The encapsulation layer is configured to cover the pixel array unit. A gate-driving circuit (not shown) for supplying a gate signal (or a scan signal) to the gate lines is provided in the vertical non-display area of the flexible substrate. The gate-driving circuit is formed during the process of manufacturing a thin film transistor of each pixel so as to be connected to each gate line.

In addition, in the case in which the display panel 210 is a flexible organic light-emitting display panel, the flexible display panel 210 includes an upper polarizer film attached to the upper surface thereof. However, the upper polarizer film may be omitted in order to maintain the flexibility of the flexible display panel 210. A very thin metal plate may be attached to the rear surface of the flexible substrate. The metal plate may be made of an invar material.

In addition, the display device 200 may further include a touchscreen (not shown) that provides an interface for user touch. The touchscreen may be attached to the flexible display panel 210, may be mounted in the flexible display panel 210 during the process of forming the pixel array unit according to an in-cell touch scheme, or may be provided through a patterning process.

The pad unit is provided at the edge of one side of the flexible display panel 210 so as to be individually connected to each of the pixel-driving lines provided at the pixel array unit. The pad unit is connected to a panel-driving circuit unit received in a controller. The pad unit connects the panel-driving circuit unit to the outside of the display area of the flexible display panel 210.

Figure 1:
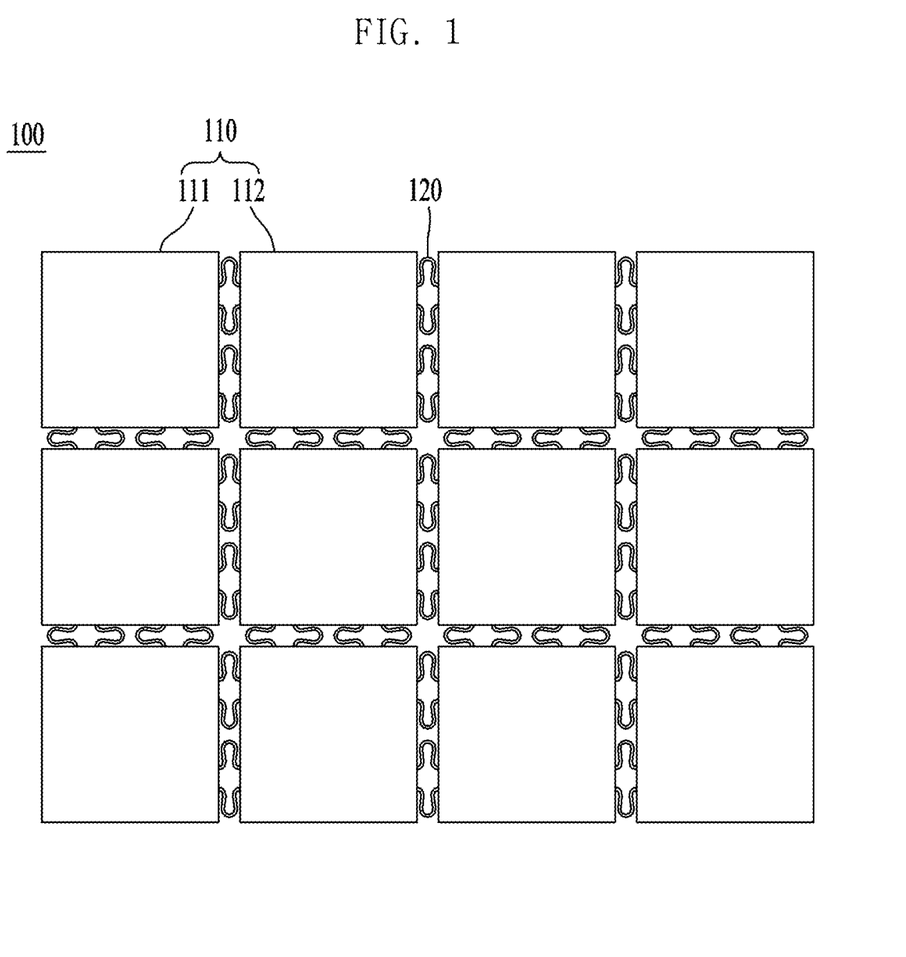
FIG. 1 is a plan view showing a back cover according to a first embodiment of the present disclosure.
Figure 2:
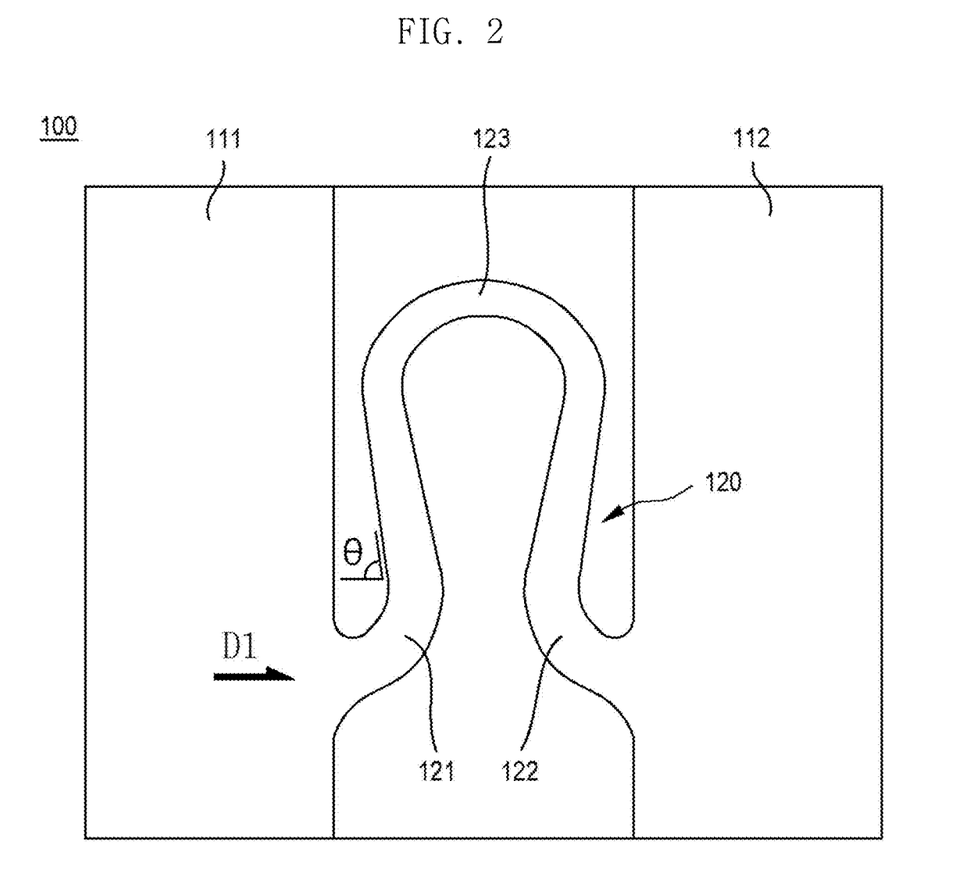
FIG. 2 is a partially enlarged view showing a connection unit of the back cover shown in FIG. 1 according to the first embodiment.

FIG. 1 is a plan view showing a back cover according to a first embodiment of the present disclosure, and FIG. 2 is a partially enlarged view showing a connection unit 120 of the back cover 100 shown in FIG. 1 according to the first embodiment.

Referring to FIGS. 1 and 2, a back cover 100 includes a plurality of unit plates 110 and a connection unit 120 for interconnecting each unit plate 110 and another unit plate adjacent thereto.

Each unit plate 110 is a thin plate made of an aluminum material. The unit plates 110 are disposed at the rear surface of the display panel 210 to support the display panel 210. In addition, each unit plate 110 may have a heat dissipation function of absorbing heat generated from the display panel 210 and discharging the absorbed heat to the outside.

The connection unit 120 interconnects the unit plates 110, which are disposed so as to be spaced apart from each other. The connection unit 120 interconnects the unit plates 110 such that the display panel 210 is supported by the unit plates 110.

At least one connection unit 120 is disposed between a first unit plate 111, which is one of the unit plates 110, and a second unit plate 112, which is another one of the unit plates 110, disposed parallel to the first unit plate 111 and adjacent to the first unit plate 111 while being spaced apart from the first unit plate 111. Of course, the first unit plate 111, the second unit plate 112, and the connection unit 120 are integrally formed from a single base material by cutting a portion of the base material defined between the unit plates 110 in the vicinity of the connection unit 120 through a pressing process. Alternatively, the connection unit 120 may be manufactured separately from the unit plates 110 and may be coupled to the unit plates 110. The connection unit 120 may be made of a material different from the material of the unit plates 110, or may have a structure different from the structure of the unit plates 110.

As shown in FIG. 2, the connection unit 120 includes a first protruding member 121 connected to the first unit plate 111, a second protruding member 122 connected to the second unit plate 112, and a first elastic member 123 for interconnecting the first protruding member 121 and the second protruding member 122. Here, the first protruding member 121 and the second protruding member 122 are remaining portions of the connection unit 120, excluding the first elastic member 123, which is formed in a "U" shape. Each of the first protruding member 121 and the second protruding member 122 protrudes from a corresponding one of the unit plates 110 so as to have a sectional shape approximating an "L".

The first protruding member 121 and the second protruding member 122 are disposed so as to be opposite each other. The reason for this is that, when tensile or compressive stress occurs between the first protruding member 121 and the second protruding member 122 in a horizontal direction, i.e. in a first direction D1, which is the direction in which the first protruding member 121 and the second protruding member 122 are opposite each other, it is possible to stably transmit force there between. Alternatively, the first protruding member 121 and the second protruding member 122 may be disposed so as not to be opposite each other.

The first elastic member 123 is curved to one side so as to have a sectional shape of a "Ω" in the direction in which the first protruding member 121 and the second protruding member 122 are opposite each other. In the case in which the magnitude of stress occurring between the unit plates 110 increases, the width of the first elastic member 123 may be increased so as to withstand the stress.

The angle θ between the first protruding member 121 and the first elastic member 123 may be at least less than 90 degrees. The reason for this is that it is possible to more easily withstand tensile or compressive stress than when the angle θ is 90 degrees or more.

Figure 3:
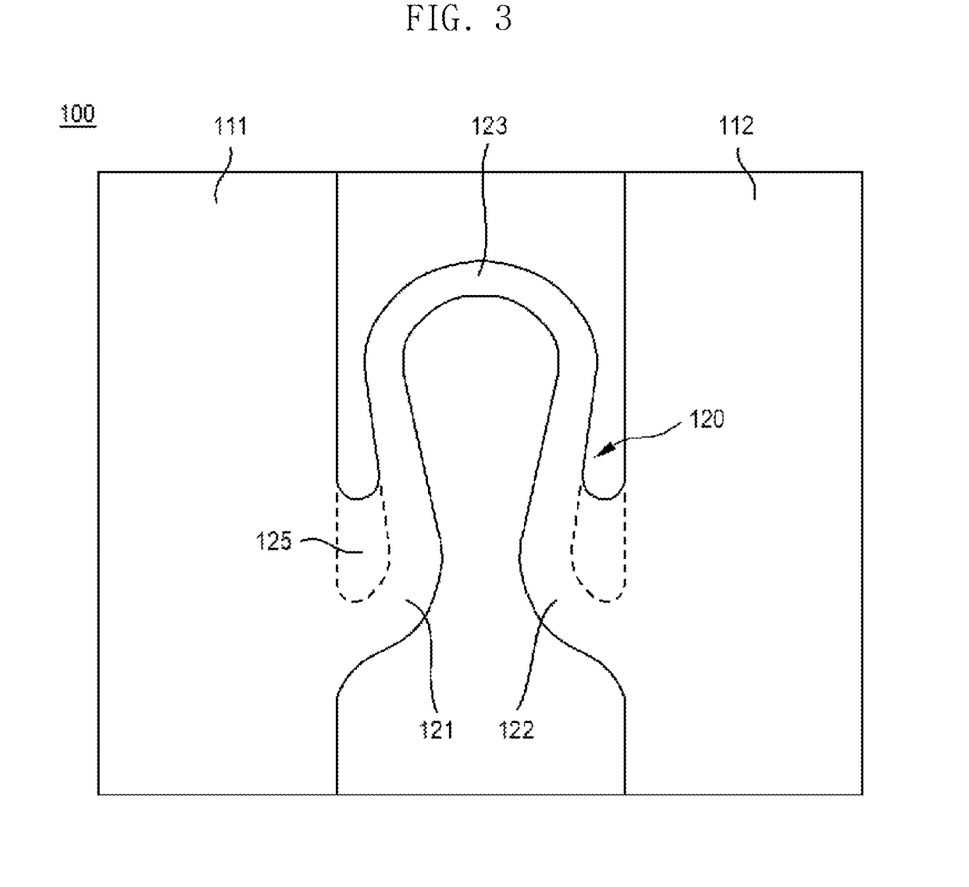
FIGS. 3 to 5 are reference views showing other embodiments of the connection unit shown in FIG. 2 according to the first embodiment.

FIG. 3 is a reference view showing another embodiment of the connection unit shown in FIG. 2.

Referring to FIG. 3, it can be seen that the areas of the first protruding member 121 and the second protruding member 122, connected respectively to the first unit plate 111 and the second unit plate 112, are greater than in the connection unit shown in FIG. 2.

Between each protruding member and a corresponding one of the unit plates is integrally provided a reinforcement member 125 for withstanding the stress applied to the first protruding member 121 and the second protruding member 122 when the magnitude of the stress is further increased. The reinforcement member 125 is formed by increasing the area of the portion of each protruding member that starts to protrude from a corresponding one of the unit plates. Consequently, the reinforcement member 125 may withstand higher stress. In addition, the reinforcement member 125 may prevent damage to the connection unit due to plastic deformation thereof. Even in this embodiment, in which the reinforcement members 125 are provided, the angle θ between the first protruding member 121 and the first elastic member 123 may be at least less than 90 degrees.

Figure 4:
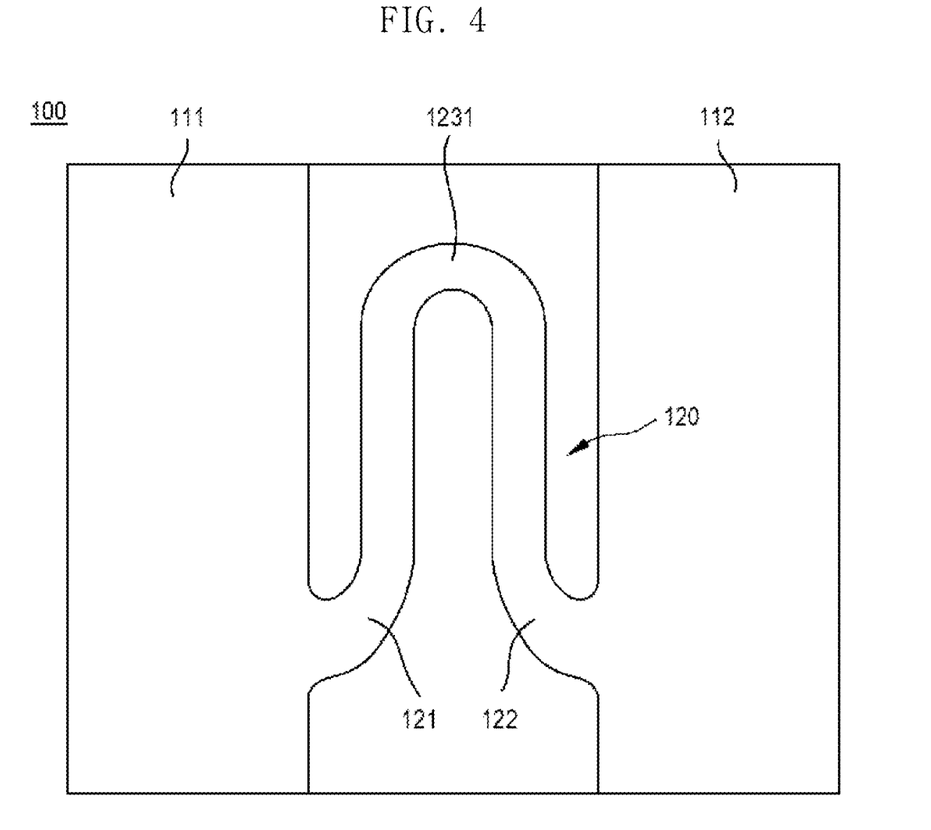

FIG. 4 is a reference view showing another embodiment of the connection unit shown in FIG. 2. The same reference numerals as the reference numerals used above refer to the same parts.

Referring to FIG. 4, the connection unit 120 includes a first protruding member 121, a second protruding member 122, and a first elastic member 1231 according to one embodiment.

The connection unit 120 is configured such that the angle between the first protruding member 121 and the first elastic member 1231 is 90 degrees. This configuration may be applied when stress is higher or when the width of deformation due to thermal expansion is smaller than in the embodiment shown in FIG. 3.

In the case in which the connection unit 120 has a sectional shape approximating a "U", the width thereof that receives tensile or compressive stress may be smaller than in the embodiment shown in FIG. 3, but the lengths of the connections between the respective protruding members 121 and 122 and the first elastic member 1231 may be increased, whereby the width of deformation due to thermal expansion may be increased. On the other hand, in the case in which the length of first elastic member 1231 connected to the respective protruding members 121 and 122 is minimized, the width of deformation may be minimized. Therefore, in the case in which the heat emission state does not reach a set range, the width of deformation may be small, but the rigidity for supporting the display panel 210 may be increased.

Figure 5:
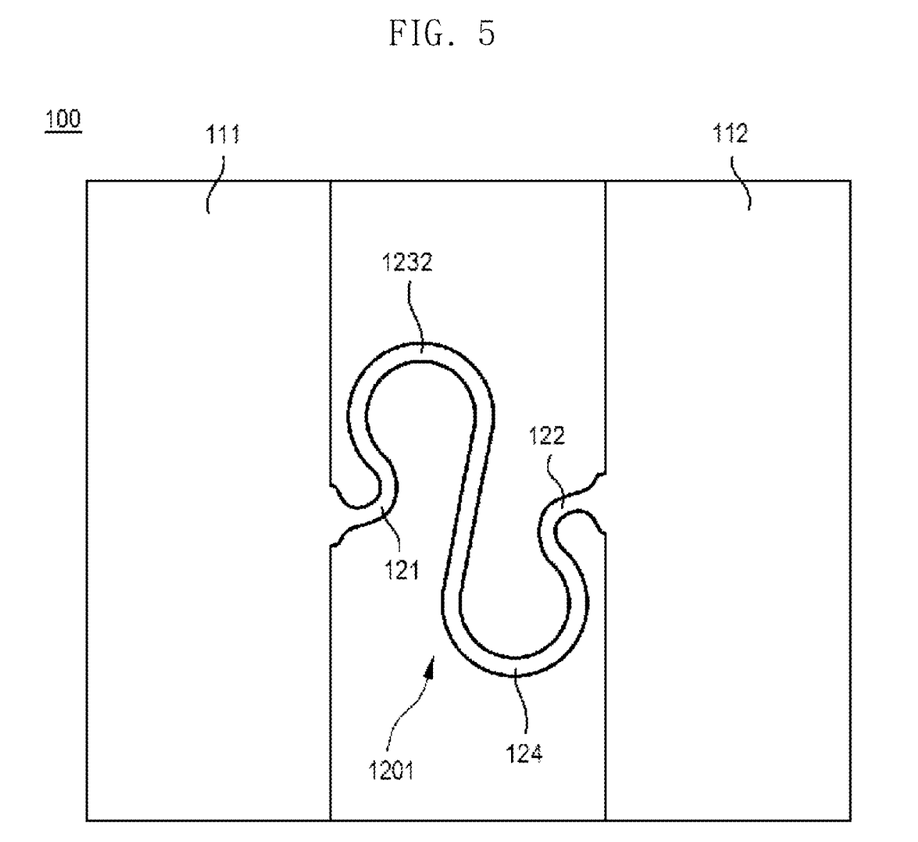

FIG. 5 is a reference view showing a further embodiment of the connection unit shown in FIG. 2.

Referring to FIG. 5, a connection unit 1201 includes a first protruding member 121, a second protruding member 122, a first elastic member 1232, and a second elastic member 124.

The first protruding member 121 protrudes from the first unit plate 111, and is bent toward the second protruding member 122. The end of the first protruding member 121 is connected to the first elastic member 1232, which is curved. The first elastic member 1232 is formed in a shape approximating a "9", and is connected to the second elastic member 124, which is opposite the first elastic member 1232. The second elastic member 124 is formed in a shape approximating a "6", and is disposed so as to be symmetrical with the first elastic member 1232. The second elastic member 124 is connected to the second protruding member 122, which protrudes from the second unit plate 112, to constitute a connection unit 1201.

In the case in which the length of the connection unit 1201 is increased, as described above, it is possible to easily accommodate a greater increase or decrease in the space between the first unit plate 111 and the second unit plate 112. Consequently, this embodiment may be applied to a display panel that generates high-temperature heat.

In addition, the sectional area or width of at least one of the first protruding member 121, the second protruding member 122, the first elastic member 1232, or the second elastic member 124 may be changed in order to adjust the width of the connection unit 1201 that is necessary in order to accommodate thermal expansion.

Figure 6:
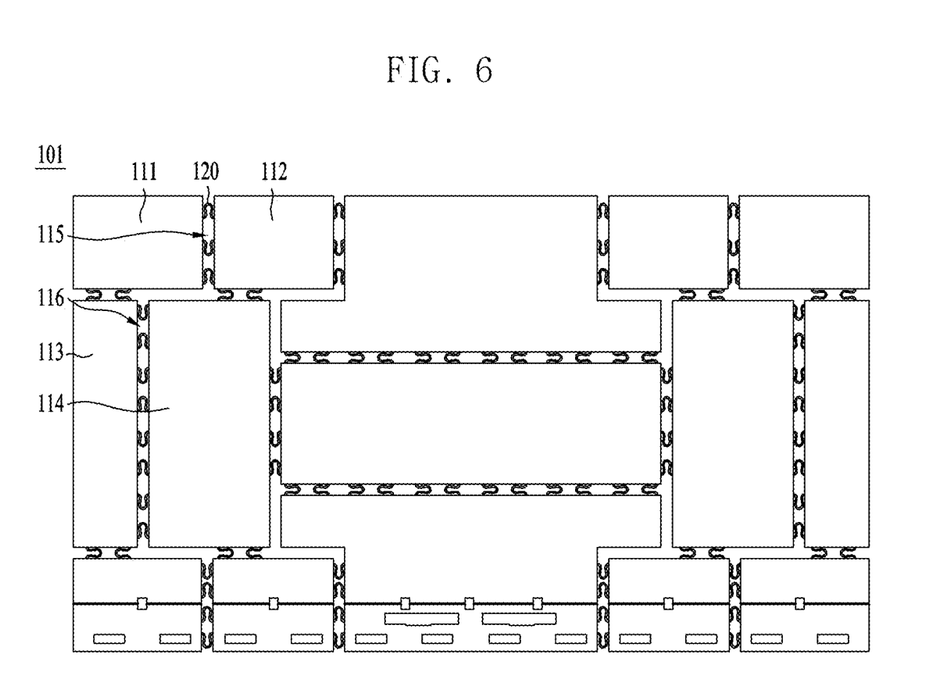
FIG. 6 is a plan view showing a back cover according to a second embodiment of the present disclosure.

FIG. 6 is a plan view showing a back cover according to a second embodiment of the present disclosure.

Referring to FIG. 6, a back cover 101 according to a second embodiment of the present disclosure is configured such that multiple unit plates have different sizes.

For example, a first unit plate 111 and a second unit plate 112, which is disposed to the right of the first unit plate 111 and is adjacent to the first unit plate 111, have the same size, a third unit plate 113, which is disposed below the first unit plate 111 and is adjacent to the first unit plate 111, has a smaller width, and a fourth unit plate 114, which is connected to the lower side of the second unit plate 112, has a larger width. In other words, a first space 115 between the first unit plate 111 and the second unit plate 112 and a second space 116 between the third unit plate 113 and the fourth unit plate 114 are not aligned with each other. This means that the deformation of a connection unit 120 between the first unit plate 111 and the second unit plate 112 and the deformation of a connection unit 120 between the third unit plate 113 and the fourth unit plate 114 do not occur in the same line. Consequently, angles or times at which the respective unit plates are bent are different from each other. As a result, it is possible to increase drooping resistance further than in the first embodiment, in which spaces are disposed so as to realize the same number of columns and rows, as shown in FIG. 1. In addition, in the case in which the back cover 101 is configured such that the number of spaces in which the unit plates are deformable in the horizontal direction is equal to the number of spaces in which the unit plates are deformable in the vertical direction and such that connection units 120 are connected to some or all of the unit plates that are disposed adjacent thereto in the spaces, it is possible to increase the drooping resistance of the display panel while more effectively accommodating thermal expansion of the display panel. That is, as shown in FIG. 6, the back cover 101 may be configured such that four spaces are formed in the horizontal direction and two spaces are formed in the vertical direction in order to uniformly transmit tensile or compressive stress to the respective unit plates via the connection units 120.

Figure 7A:
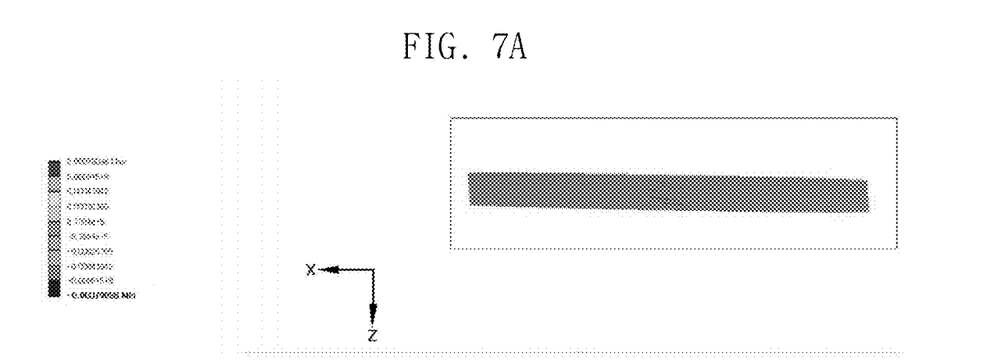
FIG. 7A and FIG. 7B are reference views showing the state in which the back cover according to the embodiment of the present disclosure is deformed due to thermal expansion thereof, compared to the conventional art.
Figure 7B:
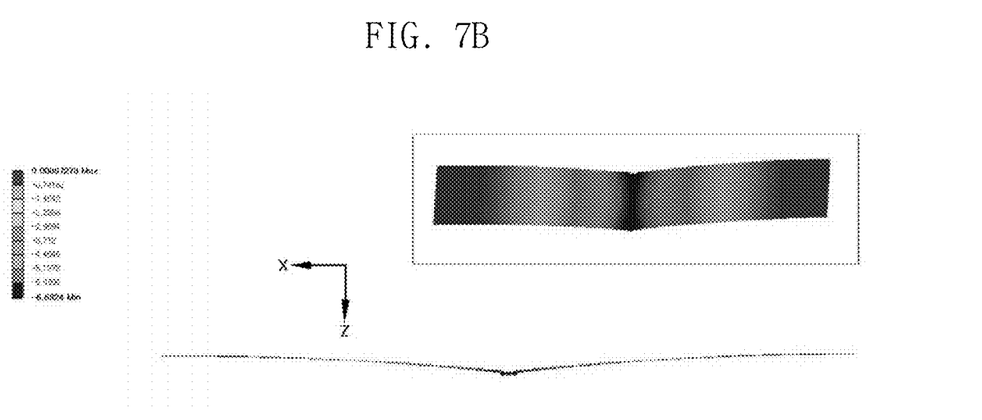

FIG. 7A and FIG. 7B are reference views showing the state in which the back cover, according to the embodiment of the present disclosure, is deformed due to thermal expansion thereof, compared to the conventional art.

FIG. 7A shows the state in which the back cover according to the embodiment of the present disclosure is deformed or moved due to thermal expansion thereof, and FIG. 7B shows the state in which a conventional back cover having a wave pattern formed in the middle thereof is deformed or moved due to thermal expansion thereof. FIGS. 7A and 7B show deformation due to thermal expansion at the same temperature (about 60° C.).

Referring to FIG. 7A, it can be seen that the surface of the back cover has the same or a similar color, which means that the amount of deformation or movement is slight. In addition, it can be seen that a height change in the z-axis direction cannot be confirmed with the naked eye. Numerically, the back cover was deformed about 0.00079096 mm downwards in the z-axis direction.

Referring to FIG. 7B, it can be seen that the color of opposite ends of the surface of the back cover is quite different from the color of the middle portion of the surface of the back cover, and it can be confirmed with the naked eye that the back cover was considerably deformed. In addition, a height change in the z-axis direction can be confirmed. Numerically, the back cover was deformed downwards about 6.6824 mm in the z-axis direction.

Consequently, the back cover according to the present disclosure is compressively deformed as a result of an increase in the length of the display panel due to thermal expansion of the display panel, whereby it is possible to securely support the display panel. In addition, the back cover is hardly moved in the z-axis direction, whereby it is possible to support the display panel such that the display panel is not damaged.

Figure 8A:
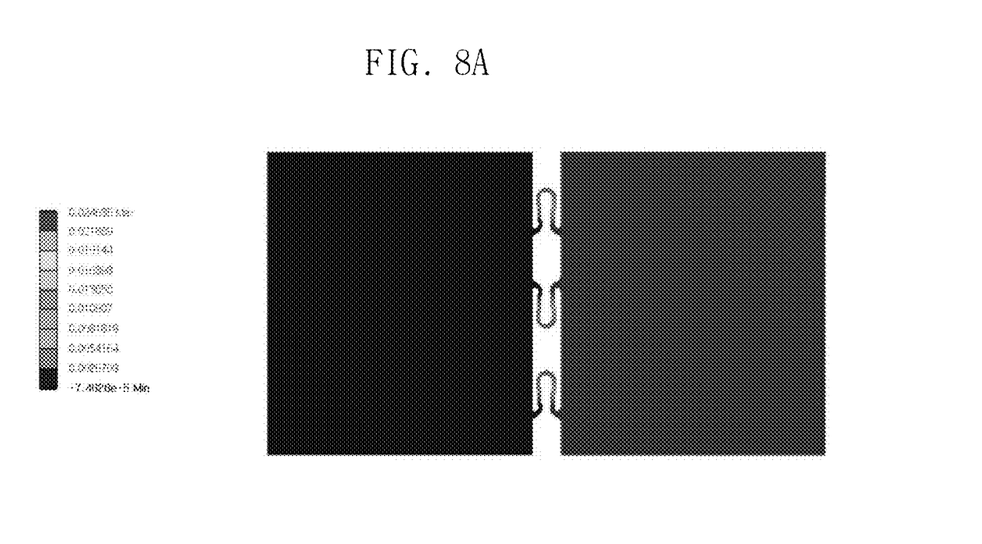
FIG. 8A, FIG. 8B, and FIG. 8C are reference views showing that the rigidity of the back cover according to the embodiment of the present disclosure is increased depending on the number of connection units.
Figure 8B:
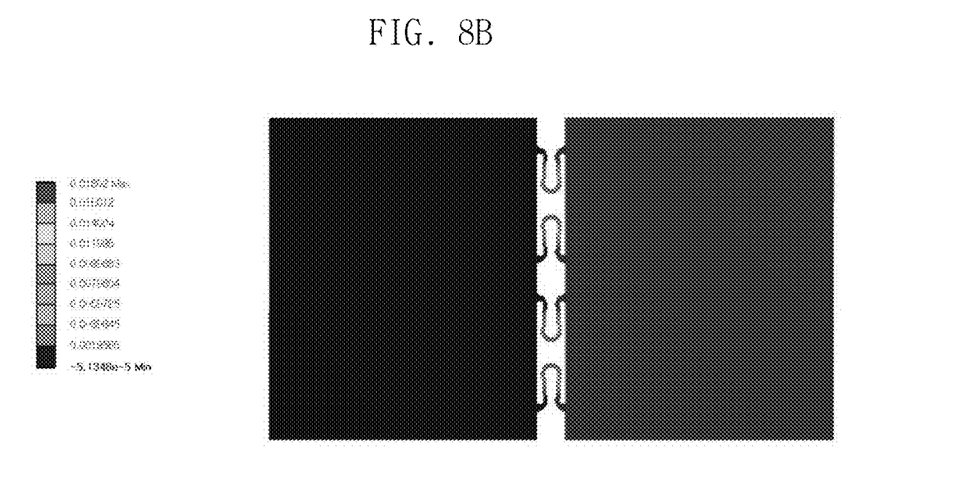
Figure 8C:
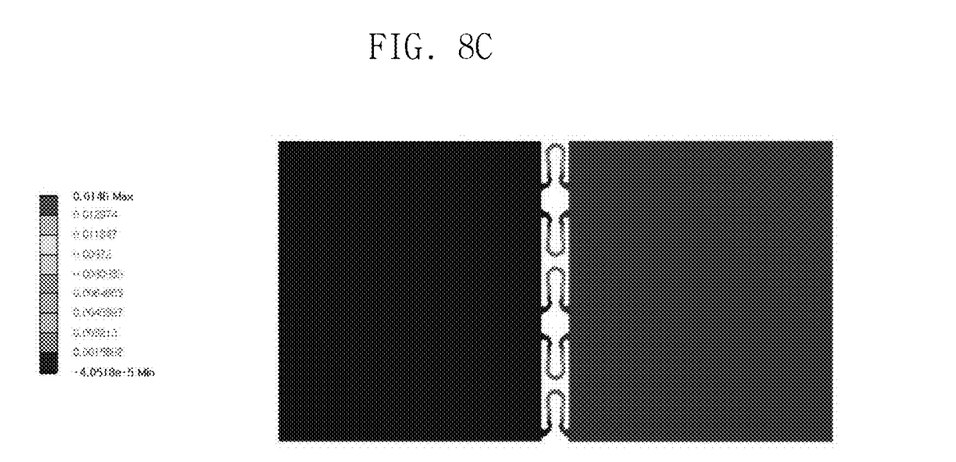

FIG. 8A, FIG. 8B, and FIG. 8C are reference views showing that the rigidity of the back cover according to the embodiment of the present disclosure is increased depending on the number of connection units.

FIG. 8A shows an example in which three connection units are provided between a pair of unit plates, FIG. 8B shows an example in which four connection units are provided between a pair of unit plates, and FIG. 8C shows an example in which five connection units are provided between a pair of unit plates.

The back covers shown in FIGS. 8A, 8B, and 8C were tested under the same condition. A first unit plate, which is disposed on the left side, is fixed, and the end of a second unit plate, which is disposed on the right side, is pulled to measure a tensile length, by which the handling efficiency of the back cover may be determined.

FIG. 8A shows that the tensile length obtained through a tensile test performed under the condition in which three connection units are provided is 0.024635 mm, which is greater than the tensile lengths in other cases.

FIG. 8B shows that the tensile length obtained through a tensile test performed under the condition in which four connection units are provided is 0.01802 mm. In addition, FIG. 8C shows that the tensile length obtained through a tensile test performed under the condition in which five connection units are provided is 0.010146 mm.

It can be seen that, as the number of connection units is decreased, the tensile length is increased. Since the tensile length under the same stress is increased as the number of connection units is decreased, it is possible to easily accommodate thermal expansion of the display panel, but the rigidity for supporting the display panel is decreased. Consequently, it is necessary to select the number of connection units in consideration of handling efficiency based thereon.

Figure 9:
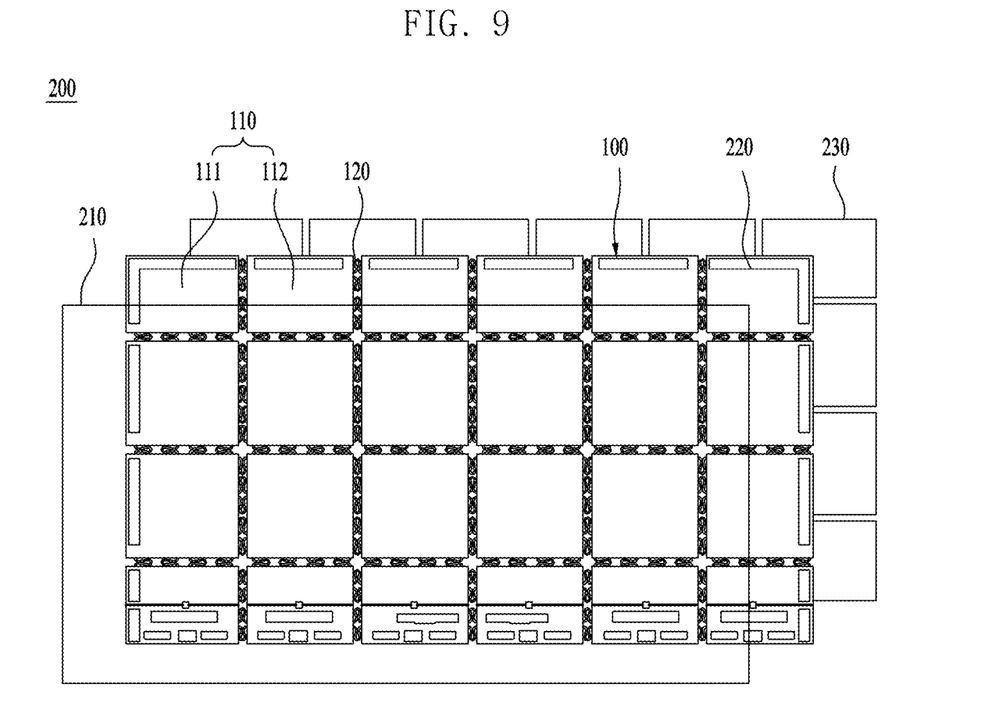
FIG. 9 is a reference view schematically showing a display device including a back cover according to the present disclosure.

FIG. 9 is a reference view schematically showing a display device including a back cover according to the present disclosure.

Referring to FIG. 9, a display device 200 according to the present disclosure includes a display panel 210, a back cover 100, and an adhesive unit 220.

A bendable OLED or LED panel may be used as the display panel 210.

The back cover 100 is coupled to the rear surface of the display panel 210. The back cover 100 is attached to the display panel 210 via the adhesive unit 220. The adhesive unit 220 is disposed at unit plates 110 disposed at the outer edge of the back cover 100. That is, the adhesive unit 220 is attached to the back cover 100 along the edge of the rear surface of the display panel 210. The reason for this is that, even when the display panel 210 and the back cover 100 are bent in the state in which the display panel 210 and the back cover 100 are coupled to each other, it is possible to prevent slippage between the display panel 210 and the back cover 100 from occurring at least at the edge thereof. Since the slippage between the display panel 210 and the back cover 100 is prevented from occurring during bending of the display panel 210 and the back cover 100, it is also possible to prevent an increase in the size of a bezel area. Of course, even a portion of the middle area of the back cover may be attached to the display panel via the adhesive unit.

In addition, a heat dissipation sheet 230 is provided at the rear surface of each unit plate 110 of the back cover 100. The heat dissipation sheet 230 discharges heat generated from the display panel 210, which is absorbed by the back cover 100, which is made of an aluminum material, to the outside, whereby heat dissipation is achieved. Consequently, it is possible to reduce deformation of the back cover 100 due to thermal expansion thereof through heat dissipation, whereby it is possible to increase the lifespan of the display panel 210.

The back cover according to the first embodiment or the second embodiment previously described may be used as the back cover 100. When the overall length of the back cover 100 is increased as a result of bending the display panel 210, therefore, the connection units 120 are compressed, whereby the distance between the first unit plate 111 and the second unit plate 112 is decreased. On the other hand, when the overall length of the back cover 100 is decreased, the connection units 120 are extended, whereby the distance between the first unit plate 111 and the second unit plate 112 is increased.

Consequently, it is possible for the back cover 100 to support the rear surface of the display panel 210 at the time of bending the display panel 210 and to prevent damage to the display panel 210 due to abnormal deformation thereof. In addition, it is possible to reduce the size of a bezel so as to realize a slim bezel product or a bezel-less product.

As is apparent from the above description, the display device according to the present disclosure has the following effects.

First, the connection unit elastically interconnects the unit plates at the rear surface of the display panel while being deformed in order to accommodate thermal expansion of the display panel, whereby it is possible to stably support the display panel.

Second, even when the display panel is bent concavely or convexly, the overall length of the back cover is elastically variable, whereby it is possible to manufacture the bezel of the display panel so as to be sufficiently slim.

Third, the heat dissipation sheet is further provided, whereby it is possible to reduce thermal expansion of the display panel.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A back cover comprising:
    a plurality of unit plates disposed at a rear surface of a display panel so as to have a predetermined pattern; and
    a plurality of connection units having one side connected to a first unit plate, which is one of the unit plates, and another side connected to a second unit plate, which is spaced apart from the first unit plate and is disposed parallel to the first unit plate,
    wherein each connection unit of the plurality of connection units is separated from each other,
    wherein at least one connection unit of the plurality of connection units comprises:
        a first protruding member protruding from the first unit plate;
        a second protruding member protruding from the second unit plate; and
        a first elastic member configured to interconnect the first protruding member and the second protruding member, the first elastic member being curved toward one side in a direction.

2. The back cover according to claim 1, wherein at least one connection unit of the plurality of connection units has a sectional shape of a "Ω".

3. The back cover according to claim 1, wherein the first elastic member is connected to the first protruding member or the second protruding member at an angle of at least less than 90 degrees.

4. The back cover according to claim 1, wherein the first protruding member comprises a reinforcement member integrally formed on a side surface of the first unit plate in a direction in which the first protruding member protrudes.

5. The back cover according to claim 1, wherein the first elastic member has a sectional area smaller than a width of the first protruding member or the second protruding member.

6. The back cover according to claim 1, wherein at least one connection unit of the plurality of connection units further comprises a second elastic member connected to the second protruding member in a shape of a curve extending from the first elastic member toward another side in the direction in which the first protruding member and the second protruding member are opposite each other.

7. The back cover according to claim 1, further comprising a heat dissipation sheet selectively attached to a rear surface of each unit plate.

8. A display device comprising:
    a display panel;
    the back cover according to claim 1, the back cover being coupled to a rear surface of the display panel; and
    an adhesive unit for coupling the display panel and the back cover to each other.

9. The display device according to claim 8, wherein
    when an overall length of the back cover is increased as a result of bending the display panel, the connection unit is compressed, whereby a distance between the first unit plate and the second unit plate is decreased, and
    when the overall length of the back cover is decreased, the connection unit is extended, whereby the distance between the first unit plate and the second unit plate is increased.

10. The back cover according to claim 1, wherein the plurality of connection units are made of a material different from a material of the plurality of unit plates.

11. The back cover according to claim 1, wherein at least one unit plate of the plurality of unit plates has a size different from a size of other unit plates of the plurality of unit plates.

12. The back cover according to claim 11, wherein a width of the at least one unit plate is different from a width of at least one of the other unit plates.

13. The back cover according to claim 11, wherein a shape of the at least one unit plate is different from a shape of at least one of the other unit plates.

14. The back cover according to claim 11, wherein a first space between the first unit plate and the second unit plate, and a second space between a third unit plate and a fourth unit plate are not aligned with each other.

15. The back cover according to claim 14, wherein a number of spaces between the first unit plate, the second unit plate, the third unit plate, and the fourth unit plate in the horizontal direction is different from a number of spaces in the vertical direction.

* * * * *